May 12, 1942.  S. BAKEWELL  2,283,029
POTATO CUTTING DEVICE
Filed Oct. 12, 1938   2 Sheets-Sheet 1
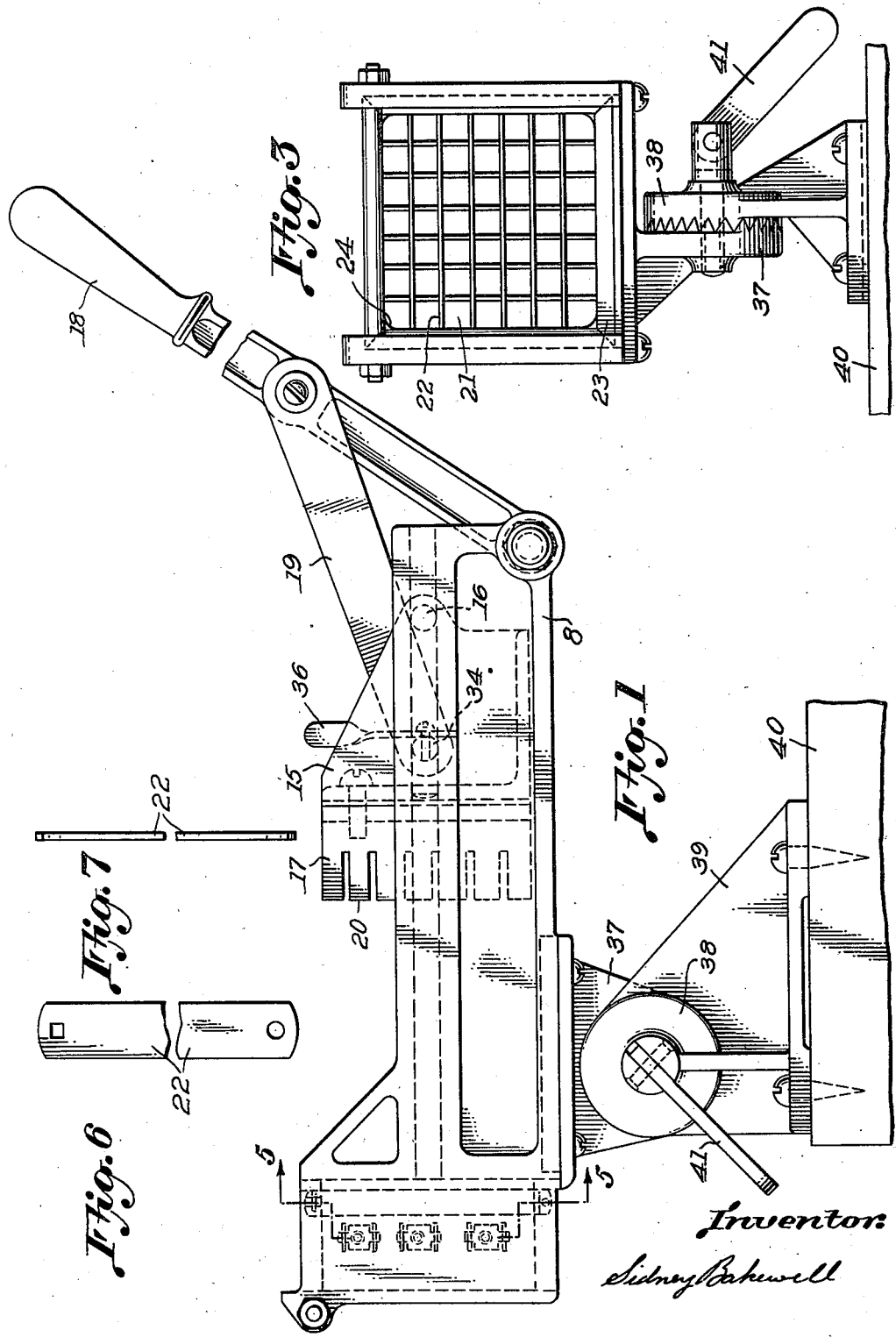
Inventor:
Sidney Bakewell May 12, 1942.  S. BAKEWELL  2,283,029
POTATO CUTTING DEVICE
Filed Oct. 12, 1938  2 Sheets-Sheet 2
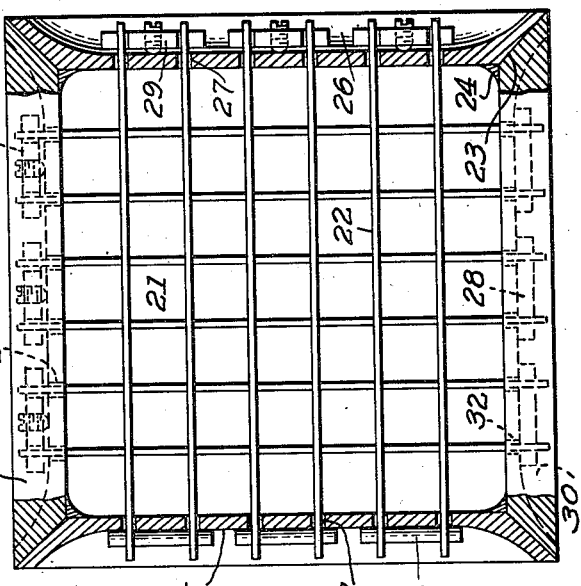
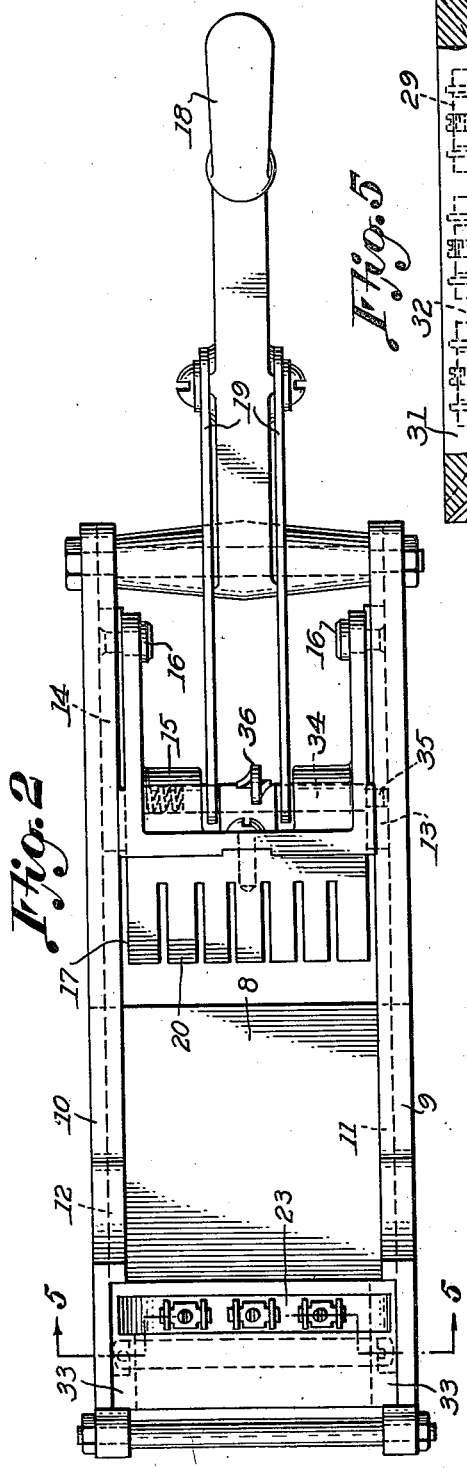
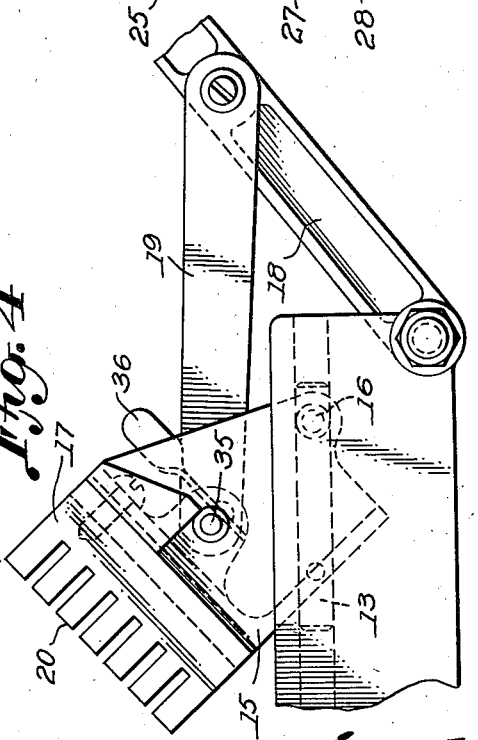
Inventor:
Sidney Bakewell Patented May 12, 1942

2,283,029

UNITED STATES PATENT OFFICE 2,283,029

POTATO-CUTTING DEVICE

Sidney Bakewell, Detroit, Mich.

Application October 12, 1938, Serial No. 234,531

3 Claims. (Cl. 146—169)

My invention relates to, principally, potato-cutting machines, and similar devices adapted to cut into convenient and desirable designs various kinds of fruit and vegetables for culinary purposes.

One of the objects sought, is to provide means to enable an operative to readily clean the knives and punches of such a machine.

Another object is, to provide a receptacle of novel structure, in which knives are removably mounted perpendicularly to each other and, in plural units respectively, held and subjected to tension by a single screw-tightening member, the said members being adapted to fit in recesses formed in the sides of the said receptacle and to lie within the perimeter thereof.

A further object comprehends means whereby the machine may be angularly set for operation, a position highly advantageous for certain kinds of work.

The invention contemplates a frame-body, normally horizontal in position, yet angularly adjustable; a slidably mounted punch-member therein, having a plurality of extensions, adapted to be operated by a lever and to closely mesh with a series of cutting blades, the said punch-member being so designed that for cleaning purposes it may be rotatively moved to a position, perpendicular to the said frame-body.

Special attention is directed to the novel structure of the knife-receptacle disclosed in the drawings, which is believed to be essential to the perfection of the mechanism. Reference to the particulars comprising the said novelty will be made later on in connection with the drawings.

The invention consists in the construction and arrangement of parts as illustrated by the accompanying drawings, and more particularly described hereinafter in a detailed specification, and pointed out in the appended claims.

The drawings:

Figure 1 is a view of a side elevation of a potato-cutting machine, illustrating a punch-member, lever means for the operation thereof; a knife-receptacle mounted in one end of the machine, a ratchet-arrangement to effect an angular position of its frame, and a pedestal to facilitate its attachment to a stand, embodying the invention.

Figure 2 is a plan view revealing a punch-member-carriage, and the manner in which it is adapted to releasably engage the said punch member; and the disclosure of a spring-controlled shaft, designed to retain and release the said punch-member-carriage in, and out of, its normal working position.

Figure 3 is an end elevation of the machine, showing knives mounted perpendicularly to each other in a knife receptacle.

Figure 4 is a partial view of a side elevation of the machine showing the punch-member moved out of its normal position to facilitate its cleaning.

Figure 5 is a sectional end-view, in elevation, of a knife-receptacle on the line 5—5 of Figures 1 and 2 respectively, illustrating anterior grooves and knife-slots in its vertical sides and posterior grooves and knife-slots in its horizontal sides for the reception of the ends of knives and their fastening members.

Figure 6 is a side view of a knife showing a hole in each end thereof for the engagement of a rod-fastener, and a screw-tightening member.

Figure 7 is an edge view of the said knife.

Throughout the various drawings like numerals designate like parts.

The numeral 8 points out the frame body of a potato-cutting machine comprising longitudinal sides 9 and 10, the inner sides of which being provided with grooves 11 and 12, respectively, for the reception of slidable members 13 and 14, respectively. A punch-member carriage 15 is axially mounted on the said slidable members by means of journals 16, the said carriage being adapted to move therewith, and to carry a punch-member 17 removably mounted in the end thereof.

A lever 18 is pivoted to the said punch-member carriage by a link member 19 and thereby adapted to operate the said carriage and punch-member.

The punch-member 17 comprises a plurality of extensions 20 adapted to mesh with corresponding openings 21 formed by knives 22 mounted perpendicularly to each other in a knife-receptacle 23. The said knife-receptacle is formed of four pieces of bar stock and arc-welded 24 together, such stock being commercially furnished in a finished form. The vertical sides of the knife-receptacle 23 are grooved 25 and 26, respectively, and each slotted 27 for the reception of the perforated ends of the said knives.

A single rod-fastener 28, in the groove 25, is adapted to fit in the perforated ends of a pair of the said knives and retain them in rigid position, while a single screw-member 29, mounted in the groove 26, is adapted to rigidly engage the oppositely perforated knife-ends, and maintain the said knives under suitable tension. The horizontal sides or the said knife-receptacle are grooved 30 and 31, respectively, and each slotted 32; such grooves being identical, in form, with those of the vertical sides, similarly equipped and supplied, the knives being mounted perpendicularly to those mounted in the said vertical grooves. It is to be noted that the vertical grooves, 25 and 26, lie in the same plane, while that of the horizontal grooves, 30 and 31, is posterior thereto and parallel therewith; that the grooves provide a housing for the rod-fasteners 28 and the screw-members 29, and that such housing is within the perimeter of the sides of the said knife-receptacle.

A recess 33 is formed in one end of the frame body 8 for the reception of the knife-receptacle 23, removably mounted therein. A spring-controlled shaft 34 is laterally mounted in the punch-member-carriage 15, one end 35 of which is adapted to engage the slidable-member 13 mounted in groove 11, and maintain the said punch-member carriage in its normal working position; a locking device 36 is associated with the said punch-member-carriage and adapted to withdraw the said shaft, and thereby permit the said punch-member carriage to be rotated to an angular position, to facilitate the cleaning of the punch-member 17 connected thereto.

The nether part of the said frame body is provided with a ratchet holding device 37 which meshes with a like member 38, integrally formed in a pedestal member 39, the said pedestal being adapted to engage a floor-stand 40 by means of screws or bolts; the said ratchet arrangement being such as to permit the said frame body of the machine to be set at any desirable angle for operation; a screw member 41 is adapted to lock the ratchet members in position.

The manner of operation is easily understandable; potatoes or other vegetable or fruit are placed in the path portion of the punch-member against the knives; the punch lever is then pressed forward, in the direction of the knife-receptacle. The extensions of the punch-member pass through the mesh openings of the knives and thus form the potatoes, fruits, etc. into agreeable designs.

What I claim as new is:

1. In a food slicing machine, in combination with a frame having slideway portions therein, a plurality of cutting portions carried by the frame, and means for forcing material through the cutting portions, comprising a pusher block slidable in said ways and having pusher sections spaced in accordance with the spacing of the cutting portions and movable to and from interengaged relation with said cutting portions, as the block slides in the ways, means including a handle for sliding the block, means for interconnecting said block and ways to allow lateral movement of the block out of the ways when desired, comprising slide elements adapted to travel in said ways and pivotally supporting said block, and manually releasable latching means normally preventing lateral movement of the block out of said ways, in all positions of the block and handle.

2. In a knife block assembly for a food cutting machine or the like, a frame having sides defining a hollow rectangle and formed of relatively stiff material of substantial thickness, a plurality of knives arranged in a parallel row and extending across said frame and through opposite sides thereof, the outer surface of one of said sides being channeled to expose the ends of the knives, the ends of said knives being housed in the channel and means also located in said channel for retaining and tensioning said knives, comprising equalizing bars extending longitudinally of the channel and centrally pivoted to rock about an axis transverse thereto, the ends of said bars being connected to adjacent knives, and means for adjusting the position of the bar with respect to its fulcrum to change the tension upon the knives while maintaining equalized tension thereupon.

3. In a knife block assembly for a food cutting machine or the like, a frame having sides defining a hollow rectangle and formed of relatively stiff material of substantial thickness, knives arranged in parallel rows and extending across said frame and through opposite sides thereof, the knives being of insufficient length to extend materially beyond the outer surfaces of said sides, the outer surfaces of said sides being longitudinally channeled to expose the ends of said knives, tensioning means located in said channels for retaining said knives and imposing direct longitudinal tension thereupon, equalizing elements also housed in said channels and connected to said knives and rockable to impose equalized tension upon a plurality of said knives.

SIDNEY BAKEWELL.